Feb. 7, 1950 A. F. SMITH 2,496,893
PNEUMATIC SUSPENSION MEANS
Filed May 28, 1945 2 Sheets—Sheet 1
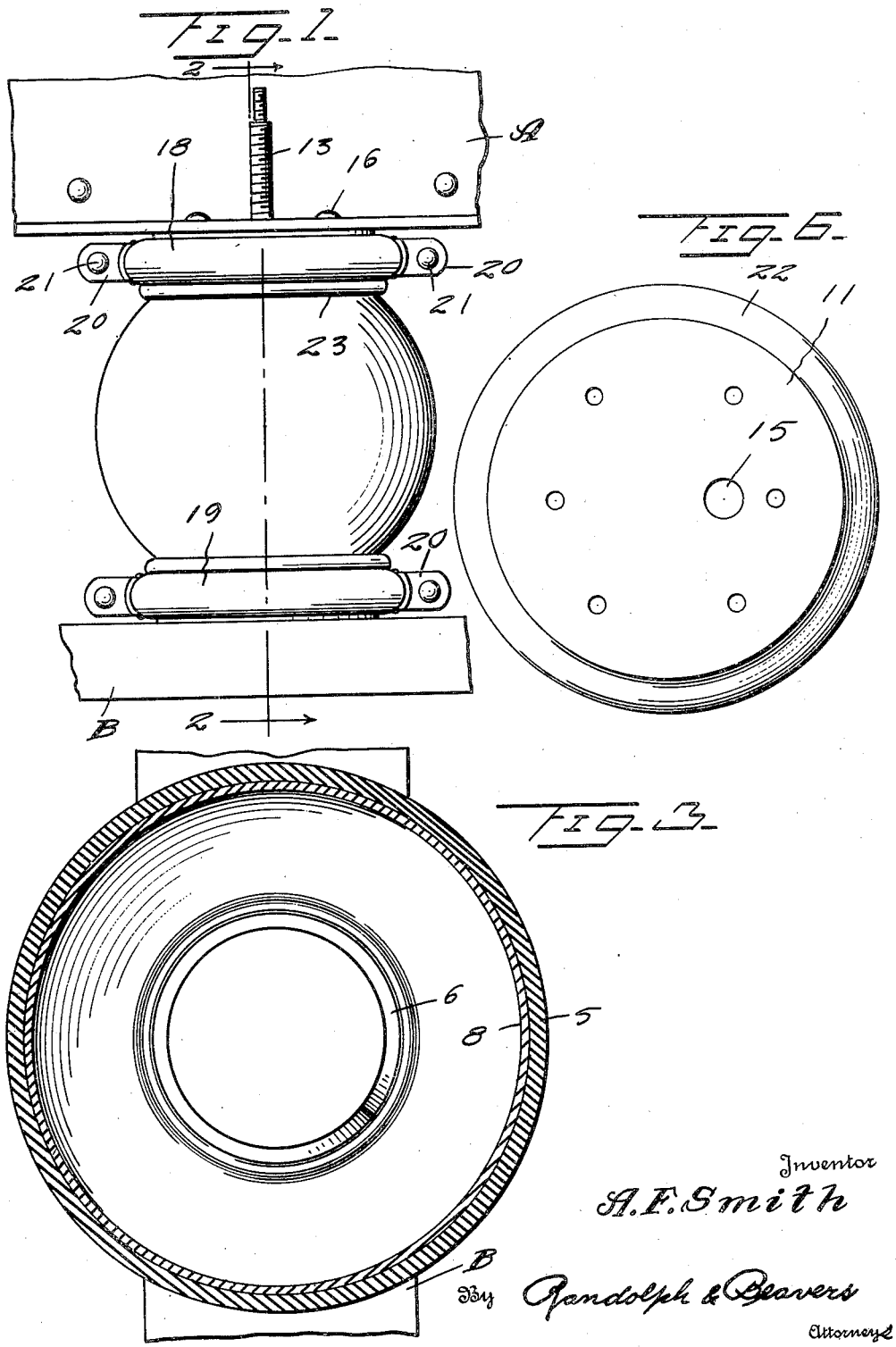
Inventor
A. F. Smith
By Randolph & Beavers
Attorneys

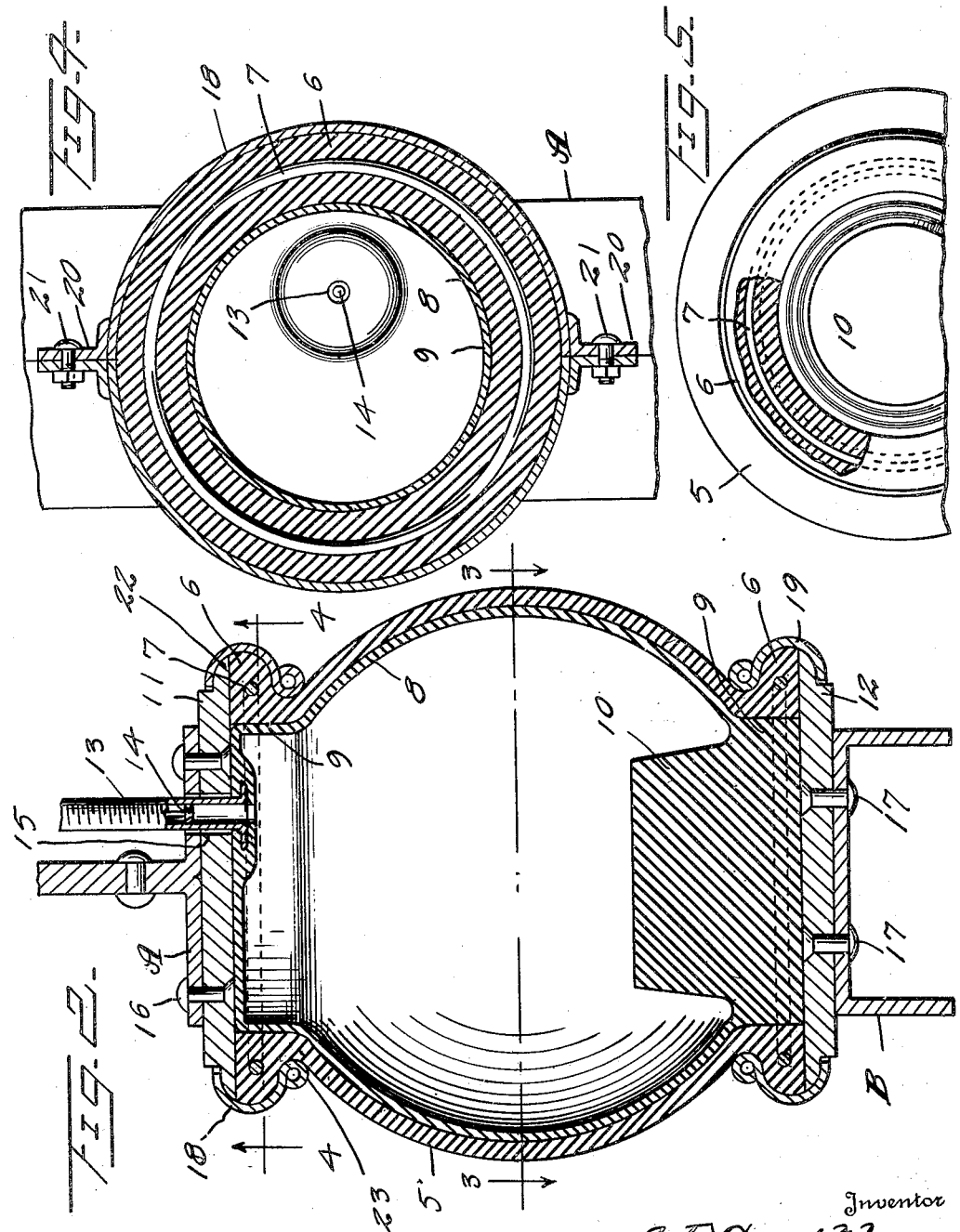

Patented Feb. 7, 1950

2,496,893

UNITED STATES PATENT OFFICE 2,496,893

PNEUMATIC SUSPENSION MEANS

Arthur F. Smith, Brooklyn, N. Y.

Application May 28, 1945, Serial No. 596,315

2 Claims. (Cl. 267—65)

The present invention relates to new and useful improvements in pneumatic suspension means for motor vehicles and other rolling stock, the principal object being to provide suspension means of the pneumatic type which will dispense with the need for spring shackles, leaf springs, shackle bolts and various other structures and elements now used on vehicles for absorbing shock.

An important object of the invention is to provide a shock absorbing pneumatic suspension means adapted to take the place of leaf and coil springs on automobiles and other vehicles, which is so constructed as to withstand tremendous shock and which allows for employment in an equalization system whereby the amount of air in each unit can be regulated to compensate for the weight of the load, or the character of terrain over which the vehicle is to operate.

These and various other important objects and advantages of the invention will become apparent to the reader of the following description.

In the drawings—

Figure 1 is a fragmentary side elevational view of one of the units.

Figure 2 is a vertical sectional view taken on line 2—2 of Figure 1.

Figure 3 is a horizontal sectional view taken on line 3—3 of Figure 2.

Figure 4 is a horizontal sectional view taken on line 4—4 of Figure 2.

Figure 5 is a fragmentary top plan view of the casing with a portion broken away and in section.

Figure 6 is a top plan view of the upper header.

Referring to the drawings wherein like numerals designate like parts, it can be seen that numeral 5 denotes a casing of preferably from four to eight ply cord, according to light or heavy duty use.

The upper and lower ends of this casing which is of substantially globular shape are open and have annular beads 6 reinforced by annular stiffeners or reinforcing elements 7.

Disposed in the casing 5 is a bladder 8 of rubber or some similar material, this being of globular shape, but having upper and lower portions 9, 10 which fit into the neck portions of the casing 5 at the beads 6. The portion 9 of the bladder 8 is solid and has an upstanding substantially frusto-conical shaped solid bumper body 10 protruding therefrom and toward the portion 9 of the bladder.

Header plates 11, 12 are provided for the upper and lower portions of the unit, these fitting against the beads 6 to close the opposite ends of the casing 5.

Projecting from the portion 9 of the bladder 8 is a threaded stem 13 containing an inflation valve 14, this stem projecting through openings 15 in the header 11 and in one flange of the automobile chassis frame A with which the unit is associated. It is preferable that the upper header 11 be riveted as at 16 to the frame A, while the lower header 12 is riveted as at 17 to the axle bar B of the vehicle.

Transversely curved and sectional rings 18, 19 are provided for the upper and lower beads 6, 6, each ring 18 having its sections provided at its ends with apertured lugs 20 through which clamp screws 21 are disposed for tightening these sections against the corresponding bead 6 and the reduced opposed end portions 22 of the adjacent header plate 11 or 12. (See Figure 2.) The header edge portions of the rings 18, 19 are preferably rolled as at 23 for the purpose of reinforcing.

For the purpose of illustrating the use of this device, let it be assumed that the unit shown in Figure 2 is opposed between a chassis frame A and an axle bar or the like B. There are preferably four of these, one in each of the four corners of a chassis frame, but of course more than four may be employed if seen fit.

The stem 13 of each unit is connected, preferably in an inflation and deflation air system (not shown).

Such a system can be utilized for supplying air uniformly to the bladders 8. For instance for heavy duty use, that is when hauling heavy loads, the amount of air in the bladder 8 will be increased to compensate for the loaded condition of the unit. For light loads, some of the air can be released to allow for more resiliency in the riding effect of the suspension device.

It is preferable that the air supply and release for these units be in the form of a single hand control on the instrument board of an automobile. A compressed air reservoir may be maintained on the vehicle for the purpose of supplying these units with the air needed in building up air pressure in these units, as when a load is to be carried.

As is apparent in the drawings, the units are capable of being readily disassembled for the purpose of repair or replacement of parts. Obviously, when the bolts 21 are removed and the rings 18, 19 displaced, the casing can be relieved from its position between the header plates 11, 12 and subsequently the bladder 8 (deflated) can be pulled from the casing 5.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. A pneumatic suspension device for interposition between a pair of relatively movable elements, comprising a resilient case open at its upper and lower portions and provided with bead formations at said portions, header plates for closing the upper and lower portions of the case and split clamp bands of channeled construction for embracing the said plates, one of said plates having an opening therethrough, a bladder in said case and an inflation valve projecting from said bladder and through the opening in the plate.

2. A pneumatic suspension device for interposition between a pair of relatively movable elements, comprising a resilient case open at its upper and lower portions and provided with bead formations at said portions, header plates for closing the upper and lower portions of the case and split clamp bands of channeled construction for embracing the said plates, one of said plates having an opening therethrough, a bladder in said case and an inflation valve projecting from said bladder and through the opening in the plate, the lower portion of the bladder being formed with a thickened plug like construction, a portion of which snugly projects into the lower portion of the case while the remaining portion projects upwardly into the bladder defining a buffer.

ARTHUR F. SMITH.

REFERENCES CITED

The following references are of record in the file of this patent:

UNITED STATES PATENTS

| Number | Name | Date |
|---|---|---|
| Re. 20,887 | Mercier | Oct. 18, 1938 |
| 792,008 | Doolittle | June 13, 1905 |
| 864,375 | Hopkinson | Aug. 27, 1907 |
| 1,797,146 | Hull | Mar. 17, 1931 |
| 2,226,605 | Geyer et al. | Dec. 31, 1940 |
| 2,317,057 | Higby | Apr. 20, 1943 |

FOREIGN PATENTS

| Number | Country | Date |
|---|---|---|
| 401,632 | France | Aug. 2, 1909 |